US008175064B2

(12) United States Patent
Tan et al.

(10) Patent No.: US 8,175,064 B2
(45) Date of Patent: May 8, 2012

(54) SYSTEM AND METHOD FOR RELAYING IN MULTI-HOP CELLULAR NETWORKS

(75) Inventors: Poy Boon Tan, Singapore (SG); Marwaha Shivanajay, Singapore (SG)

(73) Assignee: Panasonic Corporation, Kadoma-shi (JP)

( * ) Notice: Subject to any disclaimer, the term of this patent is extended or adjusted under 35 U.S.C. 154(b) by 937 days.

(21) Appl. No.: 11/577,643

(22) PCT Filed: Oct. 21, 2004

(86) PCT No.: PCT/SG2004/000348
§ 371 (c)(1),
(2), (4) Date: Apr. 20, 2007

(87) PCT Pub. No.: WO2006/043903
PCT Pub. Date: Apr. 27, 2006

(65) Prior Publication Data
US 2007/0280172 A1    Dec. 6, 2007

(51) Int. Cl.
*H04B 7/216* (2006.01)

(52) U.S. Cl. ....... 370/335; 370/315; 370/280; 455/11.1; 455/13.1

(58) Field of Classification Search .......... 370/315–350; 455/7–25
See application file for complete search history.

(56) References Cited

U.S. PATENT DOCUMENTS

| | | | |
|---|---|---|---|
| 5,987,011 A | 11/1999 | Toh | |
| 6,785,510 B2 | 8/2004 | Larsen | |
| 6,816,704 B1 | 11/2004 | Fukuda | |
| 2001/0036810 A1* | 11/2001 | Larsen | 455/11.1 |
| 2002/0028655 A1* | 3/2002 | Rosener et al. | 455/16 |
| 2002/0187746 A1 | 12/2002 | Cheng et al. | |
| 2003/0012168 A1* | 1/2003 | Elson et al. | 370/338 |
| 2003/0123401 A1* | 7/2003 | Dean | 370/318 |
| 2003/0214919 A1* | 11/2003 | Kilfoyle et al. | 370/315 |
| 2005/0053025 A1* | 3/2005 | Duffy et al. | 370/315 |

FOREIGN PATENT DOCUMENTS

| | | |
|---|---|---|
| EP | 1 170 901 A2 | 1/2002 |
| GB | 2 396 775 A | 6/2004 |
| WO | WO 96/19887 | 6/1996 |

(Continued)

OTHER PUBLICATIONS

"Relay-based Deployment Concepts for Wireless and Mobile Broadband Cellular Radio", WWRF/WG4/Subgroup on new air-interfaces White Paper: Relay-based concepts for broadband cellular radio, version 0.1, Jun. 2001, pp. 1-27.

(Continued)

*Primary Examiner* — Kent Chang
*Assistant Examiner* — Kashif Siddiqui
(74) *Attorney, Agent, or Firm* — Oblon, Spivak, McClelland, Maier & Neustadt, L.L.P.

(57) ABSTRACT

A radio communication system using TDD-CDMA multiple access system includes a base station and a plurality of mobile stations. Each mobile station includes a mechanism for measuring signal strength of coded signals from neighboring mobile stations; a mechanism for signalling the base station to switch from single-hop to multi-hop communication; and a mechanism for reporting to the base station candidate mobile stations for acting as a relay mobile station for multi-hop communication between the mobile station and the base station. The base station includes a mechanism for selecting a relay mobile station from a list of candidate mobile stations received from the mobile station.

30 Claims, 11 Drawing Sheets

FOREIGN PATENT DOCUMENTS

| WO | WO 00/54539 | 9/2000 |
|---|---|---|
| WO | WO 2004/088935 A1 | 10/2004 |

OTHER PUBLICATIONS

V. Sreng, et al., "Relayer Selection Strategies in Cellular Networks with Peer-to-Peer Relaying", IEEE Vehicular Technology Conference Fall 2003, Oct. 2003, 5 pages.

George Neonakis Aggelou, et al., "On the Relaying Capability of Next-Generation GSM Cellular Networks", IEEE Personal Communications, No. 1, Feb. 2001, pp. 40-47.

Oumer Tayeb, "FACE Future Adaptive Communication Environment: Overview of Multihop Cellular Networks", Department of Communication Technology Aalborg University, XP002323989, Jun. 23, 2003, pp. 1-15.

T.J. Harrold, et al., "Capacity Enhancement Using Intelligent Relaying for Future Personal Communication Systems", IEEE VTS Fall VTC 2000, vol. 5, XP010522161, Sep. 24, 2000, pp. 2115-2120.

Zaher Dawy, et al., "Coverage and Capacity Enhancement of CDMA Cellular Systems via Multihop Transmission", Globecome 2003, IEEE Global Telecommunications Conference, Conference Proceedings, vol. 2, XP010678500, Dec. 1, 2003, pp. 1147-1151.

Atsushi Fujiwara, et al., "Evaluation of Cell Coverage and Throughput in the Multihop CDMA Cellular Network", Vehicular Technology Conference, 2004. VTC 2004-Spring. 2004 IEEE 59th Milan, Italy, vol. 4, XP010766584, May 17, 2004, pp. 2375-2378.

Young Hoon Kwon, et al., "An Uplink Packet Relay Protocol for CDMA Cellular-like Systems", IEEE Military Communications Conference, vol. 2, XP010631902, Oct. 7, 2002, pp. 940-945.

* cited by examiner

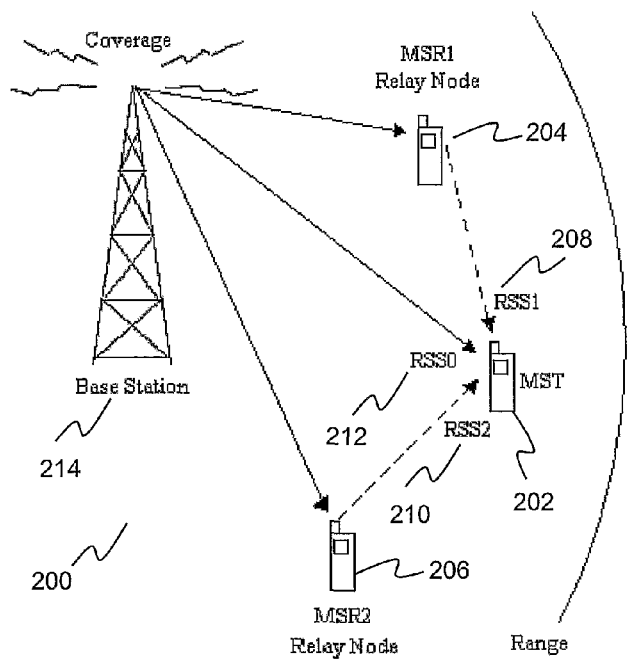
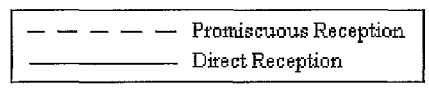
FIG. 2
| Code | RSS | Time |
|---|---|---|
| $C_1$ | $P_1$ | $T_1$ |
| $C_2$ | $P_2$ | $T_2$ |
| $C_3$ | $P_3$ | $T_3$ |
FIG. 3
| MST | MSR | BS - MST Hop / BS - MSR Hop | | | | MST - MSR Hop | | | |
|---|---|---|---|---|---|---|---|---|---|
| | | Uplink Code 1 | Uplink Time Slot 1 | Downlink Code1 | Downlink Time Slot 1 | Uplink Code 2 | Uplink Time Slot 2 | Downlink Code2 | Downlink Time Slot 2 |
| $N_1$ | 0 | $C_1$ | $T_1$ | $C_4$ | $T_4$ | | | | |
| $N_2$ | $N_1$ | $C_1$ | $T_1$ | $C_4$ | $T_4$ | $C_2$ | $T_4$ | $C_5$ | $T_1$ |
| $N_3$ | 0 | $C_3$ | $T_3$ | $C_6$ | $T_6$ | | | | |
FIG. 4

| Neighbor Node | N1 | N2 | N3 |
|---|---|---|---|
| N1 |  | $P_{1,2}$ | $P_{1,3}$ |
| N2 | $P_{2,1}$ |  | $P_{2,3}$ |
| N3 | $P_{3,1}$ | $P_{3,2}$ |  |
FIG. 5
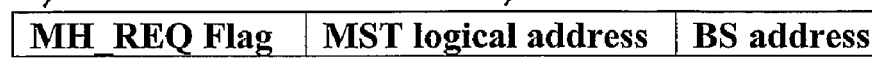
| MH_REQ Flag | MST logical address | BS address |
FIG. 6
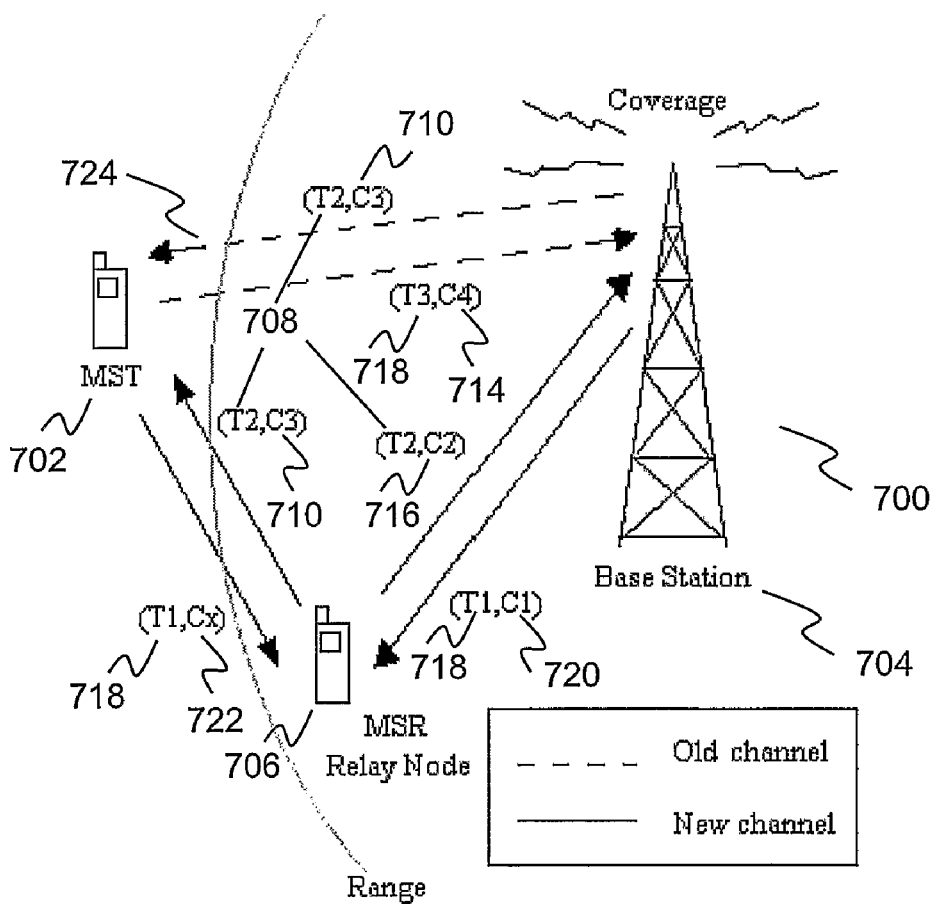
FIG. 7

Channel allocation before transition to MCN — 802

| Link | Uplink Code | Uplink Timeslot | Downlink Code | Downlink Timeslot |
|---|---|---|---|---|
| MST – BS | $C_4$ | $T_3$ | $C_3$ | $T_2$ |
| MSR – BS | $C_2$ | $T_2$ | $C_1$ | $T_1$ |

Channel allocation after transition to MCN — 804

| Link | Uplink Code | Uplink Timeslot | Downlink Code | Downlink Timeslot |
|---|---|---|---|---|
| MST – MSR | $C_x$ | $T_1$ | $C_3$ | $T_2$ |
| MSR – BS | $C_2$ | $T_2$ | $C_1$ | $T_1$ |

Signaling and Communication Sequence During Transition from SCN to MCN – Failure Case

| MST Logical Address | Uplink Code | Uplink Time Slot | Downlink Code | Downlink Time Slot |
|---|---|---|---|---|
| $N_1$ | $C_1$ | $T_1$ | $C_4$ | $T_2$ |
| $N_2$ | $C_2$ | $T_1$ | $C_5$ | $T_2$ |
| $N_3$ | $C_3$ | $T_1$ | $C_6$ | $T_2$ |

SYSTEM AND METHOD FOR RELAYING IN MULTI-HOP CELLULAR NETWORKS

FIELD OF INVENTION

The present invention relates to a system & method for relaying in multi-hop cellular networks.

BACKGROUND

Due to the widespread usage of mobile devices, there is a constant motivation to improve on the performance of cellular communication networks. In the context of a service provider, it is desirable to have high data transfer rates, low bandwidth allocation which converts to lower licensing costs and yet still be able to support a large population of mobile stations within the coverage of a service centre without the need for massive changes to the existing cellular communication networks. An example of a cellular communication network with room for improvement is one employing Time Division Duplexing (TDD) and using Code Division Multiple Access (CDMA) scheme for transmission and reception of control and user data over the air-interface.

In order to provide high data rates to the users in a CDMA-based cellular mobile communication system, a high bandwidth is generally required. As licensed bandwidth is usually scarce and expensive to own, one solution to this dilemma is by reducing the cell size and increasing frequency re-use. To service an equivalent number of users/mobile stations while reducing the cell size, a proportional increase in the number of base stations to be deployed is required. However, this approach leads to higher capital investment and raising the overall inter-cell interference in the downlink direction. Alternatively, high data rates can be achieved by using faster modulation techniques that require a higher transmission power. But this has the similar effect of raising inter-cell interference level, which limits the applicability of CDMA systems since they are inherently interference-limited.

It is suggested that a good solution to the problems may be to adopt a multi-hopping approach between the mobile stations and the service centers. Based on this approach, the advantage offered by distributed multiple access schemes such as Opportunity Driven Multiple Access (ODMA) and Carrier Sense Multiple Access (CSMA) is that paths can be subdivided into shorter hops and frequency-reuse in the same cell can be easily implemented. However, such distributed Medium Access Control (MAC) schemes do not easily fit into the conventional cellular communication systems. Further, they may require dual protocol stack, another air interface, complicated billing and authentication and would be prone to attacks from malicious users since there is no central controller.

Infrastructure-based approaches on the other hand, where the BS acts as the overall coordinating entity, makes it simpler to implement multi-hop in the present cellular systems without the addition of another protocol stack. The billing and authentication are also a lot easier and it is not difficult to detect malicious users due to the presence of the BS acting as the overall controller. The only difficulty in infrastructure-based techniques, without frequency reuse in the same cell is that large number of intermediate hops for one communication link would require more wireless resources dedicated to one user in the absence of frequency reuse.

A prior art approach to incorporate multi-hopping capability into cellular communication networks is to employ a "dual-mode" interface strategy. This strategy proposes the use of a relaying mechanism using IEEE 802.11 wireless local area network communication standard, which is added alongside the conventional Global System for Mobile (GSM) communication network protocol on the Mobile Stations (MS). However, this method carries the drawbacks of requiring significant changes to conventional protocol stack implementations and the transmission and reception circuitries, both on the MS and Base Station (BS). The added complexity will also translate into substantially more complex MS and BS designs, and also result in costlier and bulkier MS handsets with higher form factor.

Another prior art approach is to use the concept of multi-hopping capability in ad-hoc networks. However, this method cannot be directly applied to cellular communication network to achieve effective multi-hopping results. The characteristics of ad hoc networks and cellular communication networks are significantly different to warrant different approach for each type of network to achieve multi-hop communication. There is no central device or infrastructure present in an ad hoc network such as a BS or an Access Point. Hence ad hoc network protocols if directly implemented over cellular networks cannot utilise the ability of the central controlling device namely the base station system. Furthermore, in contrast with cellular communication networks, the relay MS/node selection scheme and wireless resource assignment are not closely related and interdependent in ad hoc network routing protocols. The BS dictates the choice of relay MS, influenced by the current state of radio resources assigned. On the other hand, in ad hoc networks, these two aspects are completely independent of each other. This is mainly because Carrier Sense Multiple Access/Collision Avoidance (CSMA/CA) is used to access the shared channel, and that each node picks its candidate relay node autonomously without any central party involved.

Another prior art approach to incorporate multi-hopping capability into cellular communication networks is to use an ODMA-based multiple access scheme. However, this has the serious drawback in that it cannot be easily integrated into the present cellular CDMA system because ODMA operation would require certain amount of radio resources (codes, frequency channels, time-slots) to be reserved within the cell for the purpose of multi-hop communication. This method further mandates frequent beaconing from the BS which causes increased signaling overheads and raised interference level in the up-link direction. Moreover, the method described relies on each MS to probe the calling channel actively on a regular basis in order to obtain MS-MS connectivity information. This will drain MS's battery power unnecessarily and increase the up-link interference level due to constant probing of the calling channel, even if multi-hop configuration is not activated. The method also requires excessive overhead in terms of control messages as well as computation as it requires frequent route discovery and gradient calculation every time a new connection has to be started. In the case of large number of intermediate hops, the established routes are highly prone to route failures because as the number of intermediate MSs increases in the route, there would be an increased possibility of route failure due to the higher probability of intermediate relaying (data forwarding) MSs moving away from the multi-hop communication route.

In addition to the foregoing, to achieve the aim of incorporate multi-hopping capability into cellular communication networks, some prior art approaches have been attempted but failed because of numerous problems. For example, another prior art approach does not present any signaling mechanism and means for neighborhood discovery for the use of relay node selection. It only deals with the issues related to relay node selection and channel assignment. Further, the technique presented in this prior art requires the relaying channels to be borrowed from the neighboring cells. This has adverse effects on inter-cell interference. Yet another prior art approach also does not provide a signaling mechanism. Its intent is basically to control the interference in a permissible range by applying the CDMA system to signal collision in the conventional CSMA and TDMA multi-hop systems and to relax the hidden terminal problem.

Hence, it was with knowledge of the foregoing concerns that the present invention was conceived and has now been reduced to practice.

SUMMARY

In accordance with a first aspect of the present invention there is provided a radio communication system using TDD-CDMA multiple access system comprising a base station; and a plurality of mobile stations; wherein each mobile station comprises means for measuring signal strength of coded signals from neighboring mobile stations; means for signalling the base station to switch from single-hop to multi-hop communication; and means for reporting to the base station candidate mobile stations for acting as a relay mobile station for multi-hop communication between said mobile station and the base station; and wherein the base station comprises means for selecting a relay mobile station from a list of candidate mobile stations received from said mobile station.

Each mobile station may use the same respective up-link and down-link communication timeslots in both single-hop and multi-hop communications.

Each mobile station, when functioning as a relay mobile station, may utilise the same respective up-link and down-link communication timeslots for both the communication links that is with the serving base station and with another mobile station (MST) for which the said mobile station acts as a relay mobile station, wherein different codes are used in the uplink and downlink directions for communicating with the base station and the relayed mobile station MST.

The mobile station may have the means for measuring the signal strength of coded signals from neighboring mobile stations measuring the signal strength of coded signals from neighboring mobile stations received in the same time slot as the communications received from the serving base station.

The means for measuring may scan an entire frequency channel for one complete frame and measures the signal strength of coded signals from neighboring mobile stations.

The measuring mobile station may scan the entire frequency channel if there exists no mobile station which can act as a relay mobile station whose up-link timeslot is the same as the assigned down-link timeslot of the measuring mobile station.

The relay mobile station may comprise a storage means for maintaining a forwarding table to store values of logical addresses of the base station and the mobile stations.

The base station may further comprise means for signalling to the relay mobile station using a first control message, wherein the first control message comprises downlink code used by the mobile station to communicate with the relay mobile.

The relay station may further comprises means for signalling to said mobile station using a second control message, wherein the second control message comprises an up-link code and a time slot to be used by the mobile station in communication with the relay mobile station.

The relay mobile station may comprise means for de-multiplexing a received data stream comprising of one or more of three coded signals, wherein a first coded signal is associated with data streaming from the base station and destined for the relay mobile station; a second coded signal is associated with data streaming from the base station and destined for the mobile station; and a third coded signal associated with data streaming from the mobile station to the relay mobile station; means for re-transmitting the second coded, de-multiplexed signal on the next available up-link timeslot using the up-link code specified in the received first control message; and means for multiplexing the third coded, de-multiplexed signal with an up-link data stream originating from the relay mobile station itself, on the next available up-link time-slot using the up-link code of the relay mobile station.

The relay mobile station may further comprise means of maintaining a forwarding table to store values of a logical address of the mobile station that it is serving.

Said mobile station may further comprise means to distinguish between neighboring mobile stations of the same cell and the neighboring mobile stations of adjacent cells by utilizing variation in scrambling code used in adjacent cells.

The said mobile station may further comprise means for signalling to the relay mobile station by sending a control message when said mobile station detects that received signal strength (RSS) of the base station is greater than a threshold value.

The mobile station may further comprise a timer to monitor receipt of a control message from the base station within a specified amount of time.

In accordance with a second aspect of the present invention there is provided a method for radio communication using a TDD-CDMA multiple access system comprising the steps of measuring at a mobile station signal strength of coded signals from neighboring mobile stations; signalling from the mobile station to a base station to switch from single-hop to multi-hop communication; and reporting from the mobile station to the base station candidate mobile stations for acting as a relay mobile station for multi-hop communication between the mobile station and the base station; and selecting at the base station a relay mobile station from a list of candidate mobile stations received from the mobile station.

Each mobile station may use the same respective up-link and down-link communication timeslots in both single-hop and multi-hop communications.

Each mobile station, when functioning as a relay mobile station, may utilise the same respective up-link and down-link communication timeslots for both communications with the serving base station and communications with another mobile station for which said mobile station acts as a relay mobile station.

The step of measuring at the mobile station the signal strength of coded signals from neighboring mobile stations may measure the signal strength of coded signals from neighboring mobile stations received in the same time slot as communications received from the serving base station.

The step of measuring at the mobile station may further comprise the step of scanning an entire frequency channel for one complete frame and measures the signal strength of coded signals from neighboring mobile stations.

The entire frequency channel may be scanned if there exists no mobile station which can act as a relay mobile station whose up-link timeslot is the same as the assigned down-link timeslot of the measuring mobile station.

The method may further comprise the step of maintaining in the storage means of the relay mobile station a forwarding table to store values of logical addresses of the base station and the mobile stations.

The method may further comprise the step of signalling from the base station to the relay mobile station using a first control message, wherein the first control message comprises downlink code used by the mobile station to communicate with the relay mobile.

The method may further comprise the step of signalling from the relay mobile station to the mobile station using a second control message, wherein the second control message comprises an up-link code and a time slot to be used by the mobile station in communication with the relay mobile station.

The method may further comprise de-multiplexing at the relay mobile station a received data stream comprising of one or more of three coded signals, wherein a first coded signal is associated with data streaming from the base station and destined for the relay mobile station; a second coded signal is associated with data streaming from the base station and destined for the mobile station; and a third coded signal associated with data streaming from the mobile station to the relay mobile station; re-transmitting at the relay mobile station the second coded, de-multiplexed signal on the next available up-link timeslot using the up-link code specified in the received first control message; and multiplexing at the relay mobile station the third coded, de-multiplexed signal with an up-link data stream originating from the relay mobile station itself, on the next available up-link time-slot using the up-link code of the relay mobile station.

The method may further comprise the step of maintaining at the relay mobile station a forwarding table to store values of a logical address of the mobile station that it is serving.

The method may further comprise the step of distinguishing between neighboring mobile stations of the same cell and the neighboring mobile stations of adjacent cells at the mobile station by utilizing variation in scrambling code used in adjacent cells.

The method may further comprise the step of signalling from the mobile station to the relay mobile station by sending a control message when said mobile station detects that received signal strength (RSS) of the base station is greater than a threshold value.

The method may further comprise the step of monitoring at the mobile station, by using a timer, receipt of a control message from the base station within a specified amount of time.

BRIEF DESCRIPTION OF THE DRAWINGS

Embodiments of the invention will be better understood and readily apparent to one of ordinary skill in the art from the following written description, by way of example only and in conjunction with the drawings, in which:

FIG. 2 is a schematic layout of a MCN, showing a MS, which is a potential Mobile Station Target (MST), monitoring the Received Signal Strength (RSS) from two Mobile Station Relays (MSR), MSR1 and MSR2, as described in the example embodiment.

FIG. 3 is an example of a neighbour table (NB_TABLE) maintained at each MS, containing information such as the code, RSS and time of the last signal received in the promiscuous mode from the neighbouring nodes, as described in the example embodiment.

FIG. 4 is an example of a Resource Allocation Table maintained at BS as described in the example embodiment.

FIG. 5 is an example of global neighborhood table (GLOBAL_NB_TABLE) maintained at a base station as described in the example embodiment.

FIG. 6 is an example of the format of a MH_REQ message as described in the example embodiment.

FIG. 7 is a schematic layout showing the transition to Multi-Hop from single hop as described in the example embodiment.

DETAILED DESCRIPTION

The detailed description of the example embodiments of the present invention will cover relaying data packets over wireless channel within a multi-station cellular communication network, in particular between mobile stations by utilizing multi-hop relaying. As an example, the discussion will be based on cellular communication network employing Time Division Duplexing (TDD), and utilizing Code Division Multiple Access (CDMA) scheme for transmission and reception of control and user data over the air-interface.

Figure 1:
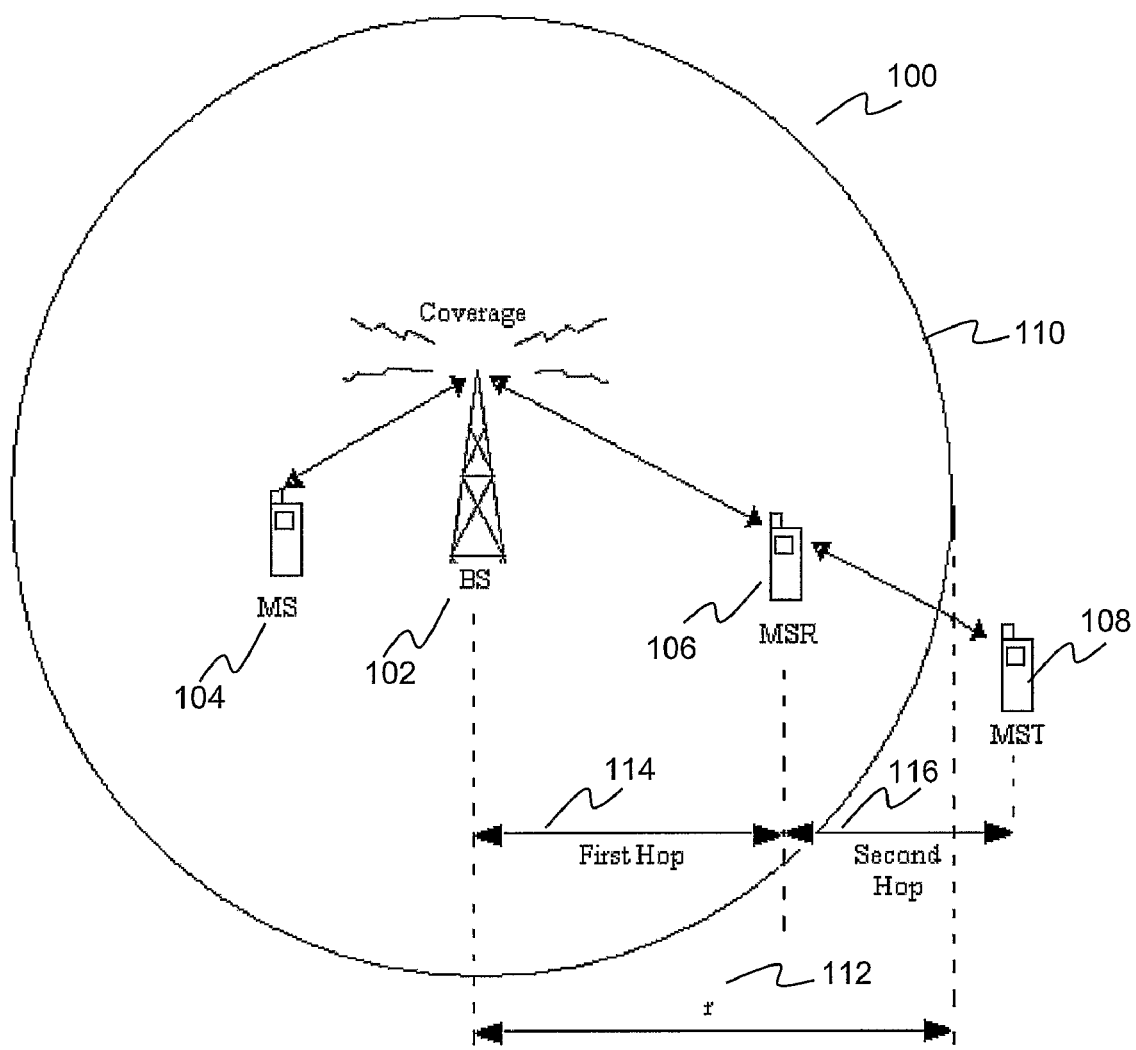
FIG. 1 is a schematic layout of a Multi-hop Cellular Network (MCN) as described in the example embodiment.

FIG. 1 illustrates a single cell multi-hop communication network (MCN) 100 comprising a BS 102 projecting a circular area of radio coverage 110 (also denoted as the BS's cell) to service a MS 104, a MSR 106 and a MST 108. The radius of the area of radio coverage is of a distance, r 112. The communication between BS 102 and MSR 106 is defined as First Hop 114 and the communication between MSR 106 and MST 108 is defined as Second Hop 116.

The MS 104, MSR 106 and MST 108 are radio communication mobile devices that comprise processing, data storage, wireless data transmission, and wireless data receiver capabilities.

The BS 102 is a central radio transmitter/receiver that is mostly fixed in a particular location and used for maintaining communications with mobile devices within a given geographical range (typically a cell site 110 as shown in FIG. 1). As it is also a radio communication device, it comprises processing, data storage, wireless data transmission, and wireless data receiver capabilities.

With reference to FIG. 1, an example embodiment of the present invention presents a method for relaying in multi-hop cellular networks in steps as follow.

Firstly, mobile stations such as MS 104 in the cellular network detect their neighbors using promiscuous mode of operation (i.e. hearing signals from other mobile stations not intended for reception at the listening mobile stations such as MS 104) in their assigned downlink timeslot.

Secondly, the step of triggering the multi-hop mechanism.

Thirdly, finding a relay MS.

Lastly, allocating resources for performing multi-hop communication between the BS 102 and a MS 104, when the MS 104 is about to leave the wireless transmission range of the BS 102.

In the example embodiment, the term 'Mobile Station (MS) 104' is used interchangeably with the term 'node' hereinafter. An MS 104 that relays data for other MSs is called as Mobile Station Relay (MSR) 106. An MS 104 that receives its data via multi-hop (two or more hops) communication and has either left or is leaving the coverage of BS 102 is called as a Mobile Station Target (MST) 108. The meaning of one hop is defined as the communication link between two MSs e.g. MSR 106 and MST 108, or between a MS 104 and the BS 102 in an MCN 100.

In a typical multi-hop scenario of the example embodiment, the relaying MS, which is the MSR 106, is at one-hop distance away from both the MST 108 and the BS 102. MST 108 keeps track of its neighbors, which are potential MSRs, and frequently sends a control message to the BS 102 to update a neighbor list. The updating scheme of this control message is not restricted to be periodic, it may be configured as event-driven, or a hybrid between the periodic and event-driven schemes. However, it shall be understood that selecting any of the above-mentioned updating scheme does not preclude an implementation from the scope of this invention.

When the MST 108 is about to leave the cell and the average value of RSS from BS 102 to MST 108 is less than a minimum threshold necessary for error-free reception, in order to maintain error-free connection with the BS 102, it sends a control message to the BS 102 to request for multi-hop communication. The BS 102 then selects a MSR as an intermediate hop and informs the selected MSR 106 of the impending multi-hop operations by sending it a reply control message as well as allocates the radio resources for multi-hop communication.

Next, the MSR 106 routes the reply control message to the MST 108 to notify that the multi-hop communication paths have been established. Finally, the MST 108 reconfigures its up-link and downlink radio resource according to the received reply from MSR 106 and begins sending and receiving user data from the BS 102 via MSR 106.

In the method, employed by the example embodiment, as described above, all MS 104 in the MCN configuration 100 measure the received signal strength (RSS) of all coded signals multiplexed on their assigned downlink frequency channel and time-slot. The set of coded signals comprise of the signals sent by the BS 102 to the measuring MS 104, as well as from other MSs 104 in the neighborhood of the measuring MS 104.

FIG. 2 shows a single cell MCN 200 of the example embodiment comprising a MS, which is a potential MST 202, monitoring the Received Signal Strength (RSS), RSS1 208 and RSS2 210 from two Mobile Station Relays, MSR1 204 and MSR2 206 respectively. The MST 202 measures RSS0 212 of the signals transmitted by the BS 214, and also measures RSS1 208 and RSS2 210 of the up-link coded signals originating from MSR1 204 and MSR2 206 respectively. In the scenario of FIG. 2, when multi-hop communication is necessary and thus requested by a MST 202, the BS 214 will select the MSR with the highest RSS value of the up-link signal transmitted to the BS 214 measured at the MST 202. This selection process will be discussed later. In the example embodiment, the up-link coded signals from MSR1 204 and MSR2 206 are intended for reception at the BS 214, but not for reception at MST 202.

With reference to FIG. 3, in the example embodiment, all potential MSTs, such as MST 202 in FIG. 2, that are capable of multi-hop communication, maintain a neighbor table (denoted as NB_TABLE hereinafter) 300, in their internal memory. For each signal received from a neighboring MS, the code 302 of that signal and the value of the respective RSS 304 are stored in the NB_TABLE 300. The monitoring node also stores the time 306 at which the signal was received so as to keep track of its active neighbors. The NB_TABLE 300 in the measuring MS is updated immediately after the assigned downlink timeslot in every frame. In the assigned downlink timeslot, the MS determines the RSS 304 of any signal from its neighbors with value greater than or equal to a predefined minimum value or RSS Threshold (denoted as RSS_THRESH hereinafter).

In the example embodiment, all MS can distinguish between the neighboring MSs registered in the same cell from the MS that are registered in neighboring (foreign) cells by de-scrambling the signal received. Since in CDMA systems, the scrambling code for all MSs operating in a given cell is same but different from that in the neighboring cells, the MS can filter out MS belonging to the neighboring cells and discard such signals.

In the example embodiment, the MS in the network periodically transmit an update of their current neighborhood to the serving BS in the up-link Control Channel (CCH). The updating scheme of this control message is not restricted to be periodic; it can be configured as event-driven also (for example, transmitted only when there's a change in order amongst top candidates for becoming a MSR), or a hybrid between the periodic and event-driven schemes. The reporting of NB_TABLE 300 can also be designed to coincide with standard reporting mechanisms such as reporting of neighboring cell strength, reporting of bit error rates (BER) and up-link transmission power. This has the desirable effect of preventing traffic in up-link CCH from proliferating excessively due to reporting of NB_TABLE 300.

Upon receiving NB_TABLE 300 update from a MS, the BS retrieves the address of all the MSs (candidate MSR) listed in the NB_TABLE 300 for which their assigned up-link time-slot is identical to the downlink time-slot used by the reporting MS, by referring to Resource Allocation Table 400 as shown in FIG. 4.

With reference to FIG. 4, in the example embodiment, the Resource Allocation Table 400 is maintained by the BS in its internal memory. The up-link and downlink code 402, 404, 410, 412 and time slots 406, 408, 414, 416 assigned to the various MS in the cell are stored in the Resource Allocation Table 400. It should be noted that in the multi-hop communication scheme presented in the example embodiment the codes 402, 404, 410, 412 for up-link and downlink are kept unique for the first hop (BS-MSR) (114 in FIG. 1) from the second hop (MSR-MST) (116 in FIG. 1).

With reference to FIG. 5, in the example embodiment, the BS maintains a global neighborhood record for all the MS in the cell called the global neighborhood table (GLOBAL_NB_TABLE) 500, which is updated when the BS receives a neighbor table (300 in FIG. 3) update from a MS belonging to its cell.

The GLOBAL_NB_TABLE 500 is a N×N two-dimensional matrix (where N is the number of MS in the cell) consisting of the address of the MS on the vertical-axis 502 and its neighboring MSs on the horizontal-axis 504. The records of the neighbouring MSs are reported to the BS by the MS during the NB_TABLE (300 in FIG. 3) updates. In the fields of the table are the values of the RSS termed as $P_{x,y}$ 506 where x is identity index of the receiver, y is the identity index of transmitter and $T_{x,y}$ is the time of last reception from that neighbor. The diagonal entries 508 are not meaningful, as an MS would not be a neighbor of itself.

FIG. 6 shows the format of a MH_REQ message. In the example embodiment, it comprises three fields, a field indicating that it is a MH_REQ message (e.g. a predefined flag comprising a string of binary numbers 602), a field indicative of the requesting MS or MST (e.g. the logical address of the MS or MST 604) and a field indicative of the servicing BS (e.g. the logical address of the BS 606). When a MS sends the MH_REQ control message 600 to its BS, the MS initializes a multi-hop request counter (MH_REQ_CNT) in its internal memory to 1 and starts a timer, $T_{MH\_REQ}$. The MH_REQ_CNT counter, which is reset when a reply from BS (denoted as MH_REP hereinafter) is received, is used to track the number of MH_REQ messages 600 that have already been sent to the BS for a same multi-hopping request, without receiving a reply from BS.

FIG. 7 shows the transition to Multi-hop (BS↔MSR↔MST) communication, as shown by non-dotted arrows 726 representative of the new channel communication, from Single hop (BS↔MS) communication, as shown by dotted lined arrows 724 representative of the old channel communication, in a mobile communication cell 700. At the start, a MS is communicating with the BS 704 in a single hop via a downlink Time slot T2 708 utilising code C3 710 for BS 704 to MS and an up-link Time slot T1 718 utilising C4 714 for MS to BS 704. As a MS moves to a region where the RSS value of the BS 704 falls below a level and where no other BS is yet detectable or where other BS's RSS is too low compared with the RSS of the present BS 704, a transition from single hop to multi-hop is necessary to keep the communication between the BS 704 and MS error free. As can be seen in FIG. 7, it illustrates the case of MS moving out of the range of radio coverage of the BS 704. The MS becomes a MST 702 once a MSR 706 is selected by the BS 704 based on the best RSS value after looking up the Resource Allocation Table (400 in FIG. 4) and GLOBAL_NB_TABLE (500 in FIG. 5). After a series of message exchanges between the BS 704 and the selected MSR 706 and provided the selected MSR 706 does not refuse the connection, a two-hop communication (BS↔MSR↔MST) is established. The two-hop communication operates via downlink Time slot T2 708 utilising code C2 716 for BS 704 to MSR 706, up-link Time slot T1 718 utilising C1 720 for MSR 706 to BS 704 and downlink Time slot T2 708 utilising code C3 710 for MSR 706 to MST 702 and up-link Time slot T1 718 utilising Cx 722 for MST 702 to MSR 706, where Cx can be any unique code other than C1 720, C2 716 and C3 710.

Figures 8, 9:
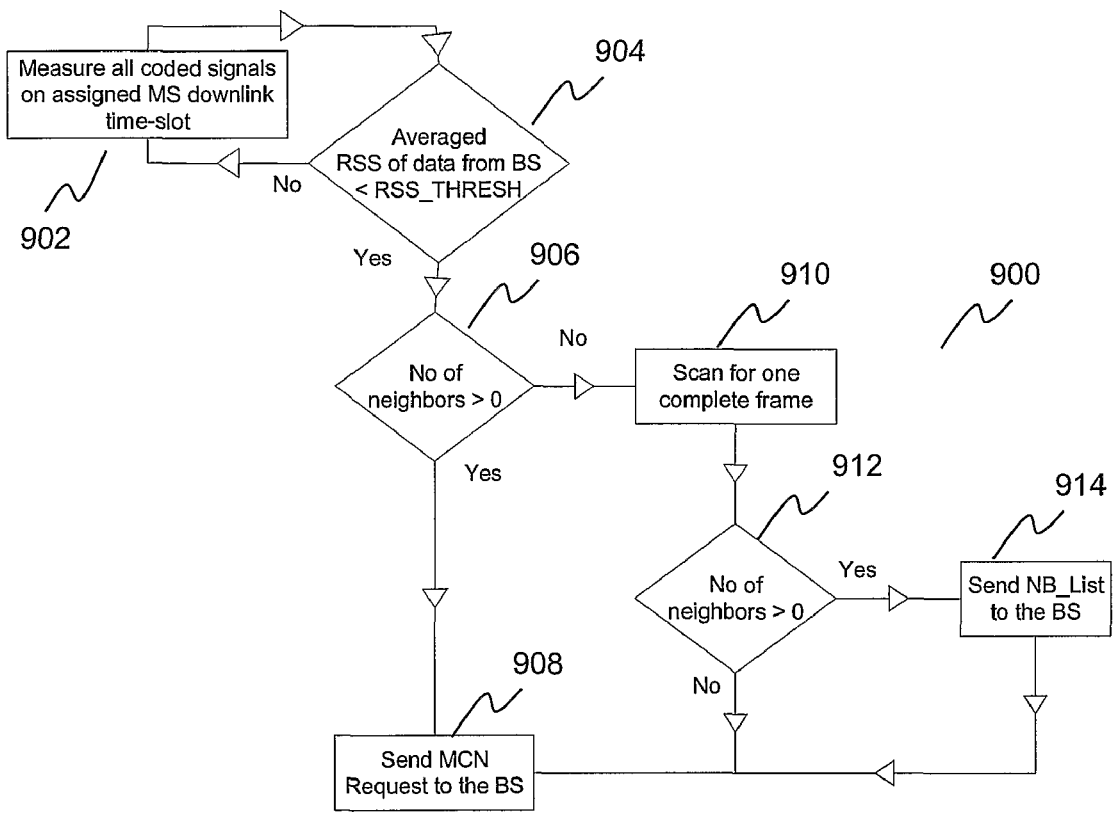
FIG. 8 is an example of a table of Channel Allocation Strategy as described in the example embodiment.
FIG. 9 is a flowchart showing the packet reception routine to be followed at a MS as described in the example embodiment.

For a clearer picture of the channel allocation strategy for FIG. 7, it is tabulated in tables 802 and 804 of FIG. 8. Table 802 shows the time slots and codes before transition to MCN, both MST (702 in FIG. 7) and MSR (706 in FIG. 7) are in single hop communication with the BS (704 in FIG. 7). Table 804 shows the time slots and codes after transition to MCN, where the BS (704 in FIG. 7), MSR (706 in FIG. 7) and MST (702 in FIG. 7) are in two hop communication.

FIG. 9 shows a message reception routine 900 adopted to update the BS at the MS. In the example embodiment, when each MS, which is MCN configured, within a single cell MCN starts to operate, a continuous loop of actions will take place to handle real-time BS updating as and when the MS is on the move. More specifically, under this routine, two actions will continue to take place until a condition starts to fail.

The two actions are measuring, in step 902, the RSS value of all coded signals on assigned MS downlink time-slot and next, checking, in step 904, whether the averaged value of RSS of the signal being received from the BS is less than the RSS_THRESH value. If the averaged RSS value is more than the pre-defined RSS_THRESH value in step 904, the next action, step 902, in the loop would be carried out again.

If the averaged RSS value is less than the pre-defined RSS_THRESH value in step 904, the MS will check the number of neighboring MSs (denoted as neighbors hereinafter) in its NB_TABLE (300 in FIG. 3).

In step 906, if the number of neighbors is greater than zero, the MS will proceed to send a MCN request to the BS in step 908. The MCN request mentioned here in the example embodiment is the sending of a MH_REQ control message (600 in FIG. 6) from a MS to the BS.

In step 906, if the number of neighbors is zero, the MS will proceed, in step 910, to scan the entire frequency channel for one complete frame to search for possible neighbours, which can be transmitting in a time-slot that is different from the downlink time-slot of the monitoring MS.

After scanning a complete frame, the MS will check again whether the number of neighbours is greater than zero in step 912. If the MS finds a neighbor in a time-slot different from it's downlink time slot, the MS will transmit this information as an update to the BS in step 914. This update can be done via a normal update to BS for example in step 914 through the use of a NB_List, which is a list containing details of the MS's NB_TABLE (300 in FIG. 3), or in the MH_REQ message (600 in FIG. 6) or in another message.

If no neighbor is found in step 912 or after a NB_List is sent to the BS in step 914, an MCN request will be sent to the BS in step 908. The BS will now be the deciding party whether or not multi-hop communication is to be established.

At the MS, after sending a MH_REQ message (600 in FIG. 6), if $T_{MH\_REQ}$ expires before a reply from BS (MH_REP message) or a BS connection rejection (denoted as MH_REJ message hereinafter) message is received, the MS re-sends another MH_REQ control message (600 in FIG. 6) to the BS and also increments MH_REQ_CNT by 1 until MH_REQ_CNT reaches the value of MH_REQ_CNT_MAX. The MS can only send up to a maximum of MH_REQ_CNT_MAX times MH_REQ message (600 in FIG. 6) to the BS for switching to multi-hop communication. When the MS fails to receive a reply from the BS after sending MH_REQ_CNT_MAX number of requests, the multi-hop request procedure is aborted. Subsequently, the call might be dropped when the received signal can no longer be detected from the BS to the MS, which is going out of the range of the cell. Depending on the BS distribution in the entire cellular network across the geographical region of coverage, handover may occur and the MS may start to connect with other BSs to form single hop or multi-hop communication.

Figure 10:
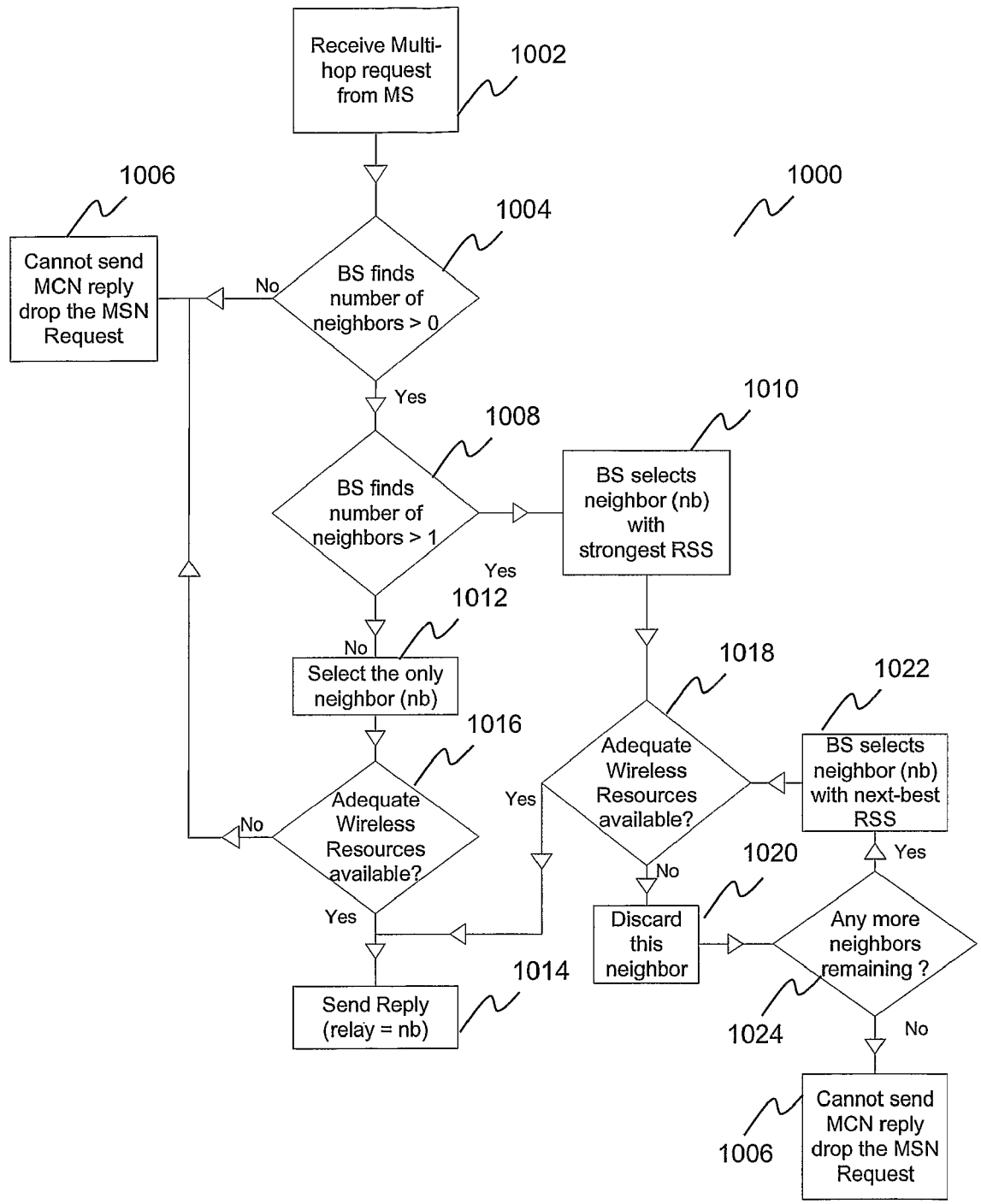
FIG. 10 is a flowchart showing a sequence of operations followed at the BS to switch from Single Hop Communication (SCN) to Multi-hop Communication (MCN) as described in the example embodiment.

FIG. 10 shows a sequence of operations 1000 of the example embodiment, which is followed at the BS to switch from a SCN to MCN.

At step 1002, the BS receives a Multi-hop request (or referred otherwise as a MCN request) from MS, which is in the case of the example embodiment, the MH_REQ control message (600 in FIG. 6) as described.

Next, in step 1004, the BS checks the number of neighbors of the MCN requesting MS by referring to the Neighbor Table (FIG. 5) and scanning through the horizontal-axis of the table corresponding to the node requesting multi-hop operation to identify a potential MSR (FIG. 5). If the number of neighbors is not greater than zero, in step 1006, the BS will conclude that a MCN reply cannot be sent and the MCN request will be dropped, for example, by sending a MH_REJ control message to the MS. In the example embodiment, the MH_REJ is sent if the BS is unable to allocate the appropriate radio resources or a relay node for multi-hop configuration.

If the BS finds that the number of neighbors is greater than zero in step 1004, it is taken that is BS is able to grant the request for multi-hopping. As such, the BS will proceed further to check whether the number of neighbors is greater than one in step 1008.

If it is greater than one, in step 1010, the BS will select a neighboring MS (denoted as nb hereinafter) from the horizontal-axis of the GLOBAL_NB_TABLE (500 in FIG. 5) corresponding to the MS, which now can be called the MST, as the MSR that has the highest value of received signal quality (or RSS value) measured at the MST.

Next, the availability of adequate wireless resources to establish the multi-hop communication would be checked at step 1018.

If sufficient wireless resources are available, this is then followed by sending a reply to the selected nb (the neighbour which is selected as the MSR) in step 1014 to inform it to start a relay session with the MS. During selection, the BS will omit a particular MS from the list of candidate MSRs in the tables if this MS is the MST of another multi-hopping communication session. In the example embodiment, the reply to selected nb refers to the MH_REP control message that is used for responding positively to a multi-hopping request when a suitable neighbor is found.

If there are insufficient wireless resources, the selected nb will be discarded in step 1020. The GLOBAL_NB_TABLE (500 in FIG. 5) will be referred to again to check whether there are any more neighbours remaining in step 1024.

If more neighbours exist for selection, in step 1022, the BS will select the neighbour with the next best RSS.

If no more neighbours remain, the BS will conclude that a MCN reply cannot be sent and the MCN request will be dropped, for example, by sending a MH_REJ control message to the MS in step 1006.

If there is only one neighbor, the only neighbor (denoted here as nb hereinafter) will be selected in step 1012. Then, in step 1016, the availability of adequate wireless resources to establish the multi-hop communication would be checked at step 1018. If sufficient wireless resources are available, this is followed by sending a reply (MH_REP) to nb in step 1014 to inform it to start a relay session with the MST. If there are insufficient wireless resources, the BS will conclude that a MCN reply cannot be sent and the MCN request will be dropped in step 1006, for example, by sending a MH_REJ control message to the MS.

Figure 11:
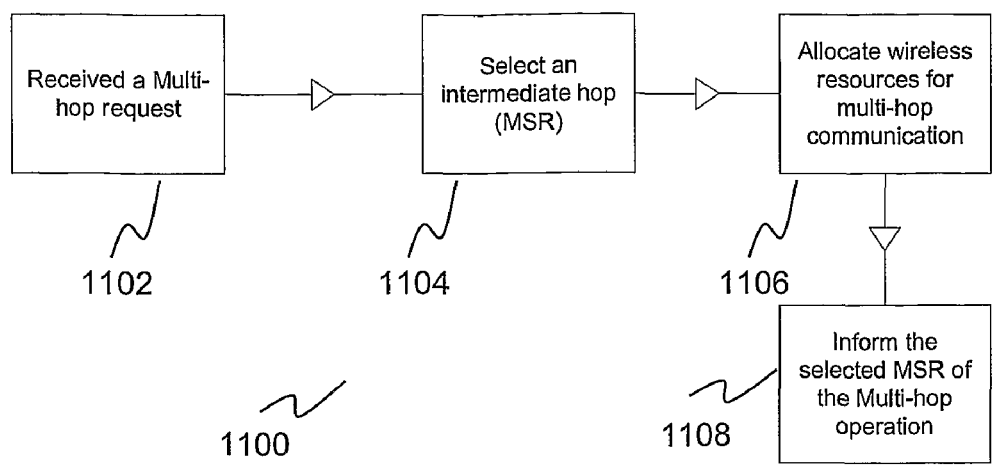
FIG. 11 is a flowchart showing the overview of the transition operation at a BS from SCN to MCN as described in the example embodiment.

FIG. 11 shows an overview of the transition operation 1100 at the example embodiment at the BS from the SCN to MCN, which is operating concurrently with the sequence of operations 1000 as shown in FIG. 10.

At step 1102, the BS receives a multi-hop request, which is equivalent to step 1002 of FIG. 10.

Next, in step 1104, the BS selects an intermediate hop, which is equivalent to following through the steps 1004, 1008 and 1010 or 1004, 1008 and 1012 or 1004, 1008, 1010, 1018, 1020, 1024 and 1022 in that order of FIG. 10.

Next, in step 1106, the BS allocates resources for multi-hopping by reconfiguring the channel parameters for MSR. For example, reconfiguring Quality of Service (QoS) level, reconfiguring the multiplexing and de-multiplexing of logical channel for relaying and relayed MSs if more than one exists. The configuration instructions can be sent to the MSR, similarly, by way of the BS sending protocol packets via radio transmission to the MSR or embedding the information message within a MH_REP control message.

Then in step 1108, the BS informs the selected MSR of the Multi-hop operation. This can be done for example by way of the BS sending protocol packets via radio transmission to the MSR or embedding the information message within a MH_REP control message.

Following that, the BS sends a multi-hop reply to the MSR, which is directed to the MST to request for multi-hop operation. This step is equivalent to step 1014 of FIG. 10 where the BS sends a MH_REP control message to nb. This message contains the downlink code currently used by the MST and the new up-link code to be applied by the MST. The BS also starts a Multi-hop communication timer (MCN_TIMER) to keep track of the MH_REP. If the BS does not receive an acknowledgement (MH_REP_ACK) from the MSR, it sends another MH_REP to the next best MSR and so on until the MCN_TIMER expires.

Figure 12:
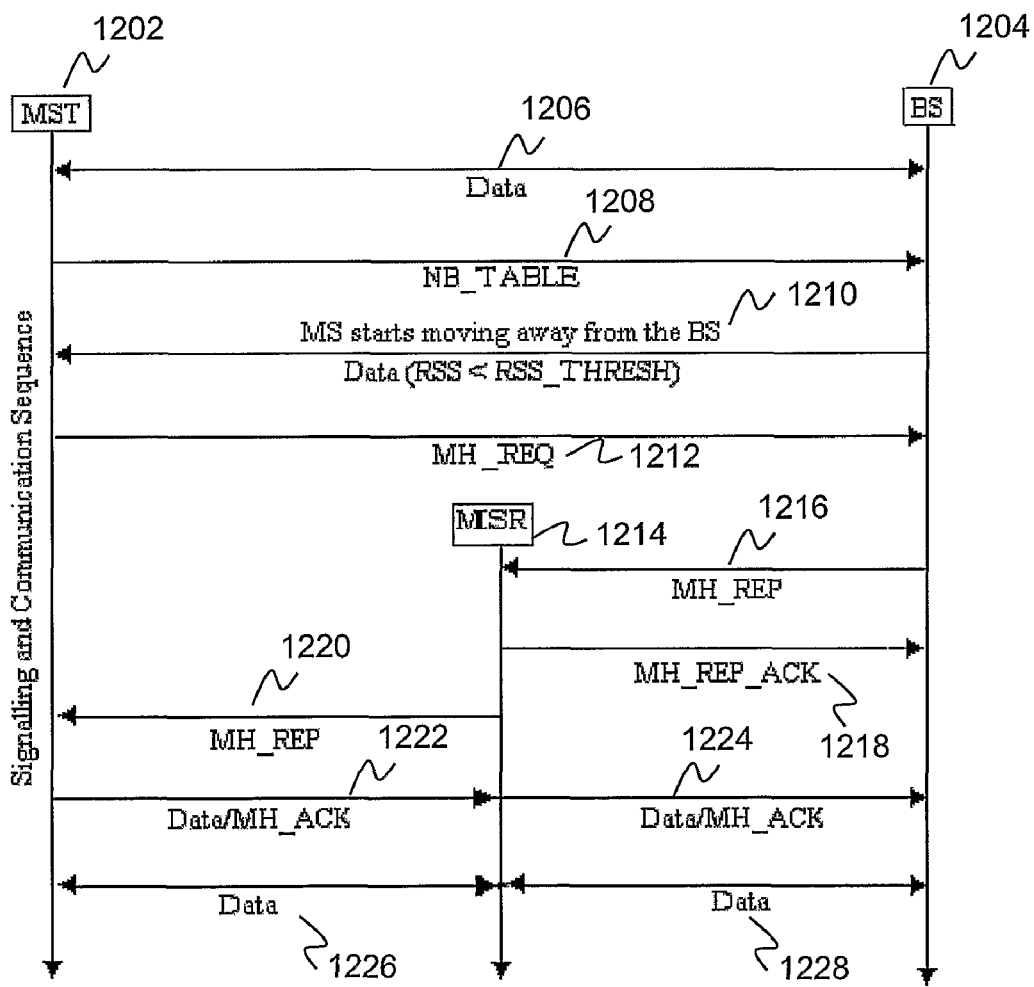
FIG. 12 is a time chart, showing a successful case of signaling and communication sequence during transition from SCN to MCN, as described in the example embodiment.

The complete picture of data exchange between the BS, MST and MSR for a successful case of multi-hop communication with a single MSR can be better described by looking at the time chart 1200 as shown in FIG. 12.

At the start, a MST 1202 and a BS 1204 are engaged in a single hop communication. Data transmission occurs directly between them at time instance 1206. The MST 1202, which is configured to Multi-hop mode and thus capable of multi-hop communication, also frequently updates the BS 1204 with details from its NB_TABLE at time instance 1208 (300 in FIG. 3).

As the MST 1202 starts to move away from the BS 1204 at time instance 1210, the distance between them gets longer and the radio reception at the MST of the BS's signals or vice versa gets poorer. This happens until the radio signals for Data transmissions measured in terms of RSS units for the BS 1204 received at the MST 1202 falls below a pre-defined RSS threshold value. When this occurs, at time instance 1212, the MST 1202 immediately sends a MH_REQ control message (600 in FIG. 6) to the BS 1204 to request for multi-hop communication so as to allow data transmission between the MST 1202 and BS 1204 to carry on.

Linking the time chart 1200 to FIG. 9, time instances 1206 to 1212 illustrates the communication taking place between the MST 1202 and BS 1204 as the steps of FIG. 9 are carried out. Actions occurring at time instances 1206 and 1208 happen during the continuous loop of steps 902 and 904 in FIG. 9. The action occurring at time instance 1210 happens when the condition at step 904 is satisfied. Next, the action occurring at time instance 1212 occurs at step 908 where sending an MCN request is essentially sending a MH_REQ control message (600 in FIG. 6) in the example embodiment. Steps 906, 910, 912 and 914 in FIG. 9 are executed between time instances 1210 and 1212.

After the MST 1202 sends a MH_REQ control message (600 in FIG. 6) to the BS 1204 at time instance 1212, provided the radio transmission of MH_REQ control message (600 in FIG. 6) reaches BS 1204, the BS 1204 will proceed with executing operations defined in FIG. 10 to seek a MSR (or nb as described above). Linking the time chart 1200 to FIG. 10 and assuming the BS 1204 manages to find at least one neighbor of the MST 1202 at step 1004 of FIG. 10, a MSR 1214 will be selected in step 1010 or 1012 or 1022 of FIG. 10. Once the MSR 1214 is selected in step 1010 or 1012 or 1022 of FIG. 10, the BS 1204 will send a MH_REP control message to the MSR 1214 (provided that the adequate wireless resources are available for the handover to multi-hop communication) in step 1014 of FIG. 10, this occurring correspondingly with time instance 1216.

Linking FIG. 11 and FIG. 12, step 1102 of FIG. 11 corresponds with the receipt of MH_REQ control message (600 in FIG. 6) at time instance 1212. Steps 1104, 1106 and 1108 of FIG. 11 are carried out between the time instances of 1212 and 1216.

If the MSR 1214 is capable and willing of establishing a multi-hop communication with the MST 1202, it will send a MH_REP acknowledgement (MH_REP_ACK) control message to the BS 1204 at time instance 1218. Thereafter at time instance 1220, the MSR 1214 sends a MH_REP comprising of the intended information from the BS 1204 to the MST 1202.

If the MST 1202 is capable of establishing multi-hop communication with MSR 1214 and BS 1204, it sends a Multi-hop acknowledgement (MH_ACK) to the MSR 1214 at time instance 1222. In another example embodiment, the transmission of Data may be sent to the MSR 1214 immediately at time instance 1222 instead. In this case, the Data also serves as an indication for an acknowledgement. Alternatively, Data may be embedded along with the MH_ACK control message.

Once the Data/MH_ACK is sent to the MSR 1214, the MSR 1214 forwards the same to the BS 1204 at time instance 1224. After that, Data transmission between the BS 1204 and MST 1202 continues as if they are in single hop communication with the MSR 1214 acting as the relaying station. Data sent to and fro between the MST 1202 and MSR 1214 is shown in time instance 1226, and Data sent to and fro between the MSR 1214 and BS 1204 is shown in time instance 1228.

Figure 13:
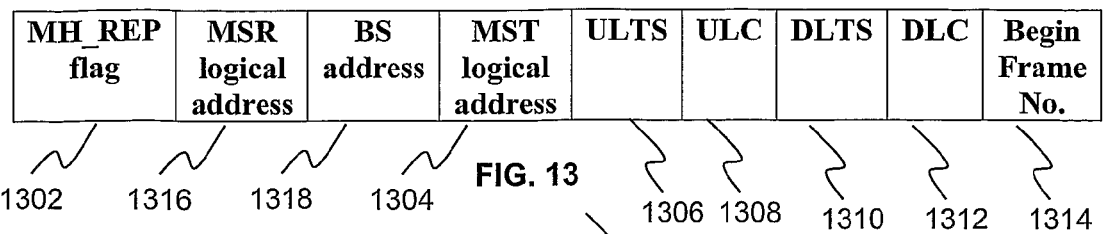
FIG. 13 is an example of the format of a MH_REP message as described in the example embodiment.

FIG. 13 shows an example of the format of a MH_REP message 1300. The MSR forwards the MH_REP message to the MST. In the example embodiment, the MH_REP control message comprise of:
a. a Multi-hop reply flag (MH_REP_FLAG) 1302;
b. a Logical address of the MSR 1316;
c. a Logical address of the BS 1318;
d. a Logical address of the MST 1304;
e. Resources made available for MCN for MSR-MST communication, i.e. Up-link time slot (ULTS) 1306 and code (ULC) 1308 for the MST as well as
downlink time-slot (DLTS) 1310 and code (DLC) 1312 for the MST.
f. Time frame in which the MCN operation is scheduled to begin.

Figure 14:
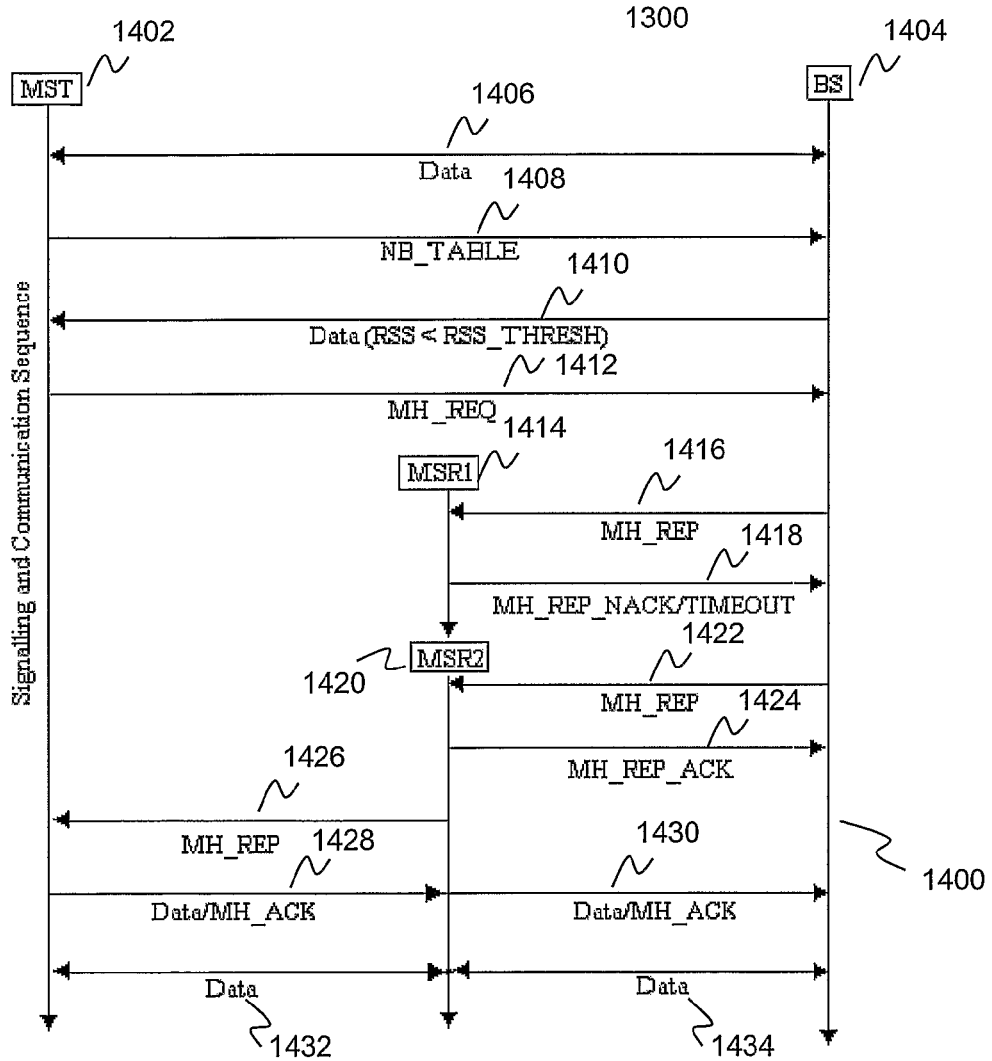
FIG. 14 is a time chart, showing a successful case after MSR re-selection of signaling and communication sequence during transition from SCN to MCN, as described in the example embodiment.

The complete picture of data exchange between the BS, MST and MSR for a successful case of multi-hop communication after MSR reselection is described by time chart 1400 as shown in FIG. 14.

The first few sequences of time chart 1400 are exactly the same as FIG. 12. MST 1402 is the same as MST 1202 in FIG. 12. BS 1404 is the same as BS 1204 in FIG. 12. Actions occurring from time instance 1406, 1408, 1410 to time instance 1412 in that order are the same as the actions occurring from time instance 1206, 1208, 1210 to time instance 1212 of FIG. 12 in that order.

In FIG. 14, after the BS 1404 has followed through various operations as described previously to select a first Mobile Station Relay 1 (MSR1) 1414, the BS 1404 sends an MH_REP control message (1300 in FIG. 13) to MSR1 1414 at time instance 1416. After a MH_REP control message (1300 in FIG. 13) is sent, the BS, in this case BS 1404, will start a Multi-hop communication timer (MCN_TIMER) to keep track of the MH_REP.

If the BS does not receive an acknowledgement (MH_REP_ACK) from the MSR, in this case MSR1 1414, it will send another MH_REP (1300 in FIG. 13) to the next best MSR, in this case Mobile Station Relay 2 (MSR2) in this case MSR2 1420, and so on until the MCN_TIMER expires. Therefore, at time instance 1418, if a Multi-hop reply negative acknowledgement (MH_REP_NACK) message is received by the BS 1404 or if the MCN_TIMER timeouts, the BS 1404 will send another MH_REP control message (1300 in FIG. 13) to MSR2 1420, which is the next best MSR, at time instance 1422. The case of a selected MSR not able to accept the MCN connection may be due to, for example, unfavorable radio condition in the up-link direction or low remaining battery power. In addition, in the example embodiment, between time instance 1412 to the instance just before time instance 1418, if another MH_REQ message (600 in FIG. 6) is received from the MST 1402 again, the BS 1404 resets the MCN_TIMER to its maximum value.

If MSR2 1420 is capable of establishing multi-hop communication at the time instance of receiving request as in the case of FIG. 14, that is at time instance 1422, MSR2 1420 will now operate in the same manner as MSR 1214 in FIG. 12. Thereafter subsequent actions occurring from time instances 1424, 1426, 1428, 1430, 1432 to time instance 1434 in that order will be exactly the same as actions occurring from time instances 1218, 1220, 1222, 1224, 1226 to time instance 1228 of FIG. 12 in that order.

If the serving BS described previously fails to find an MSR for the MCN operation, it will send a Multi-hop reject (MH_REJ) control message to the MST. This ensures that the MST does not keep sending further MH_REQ messages (600 in FIG. 6) to the BS.

Figure 15:
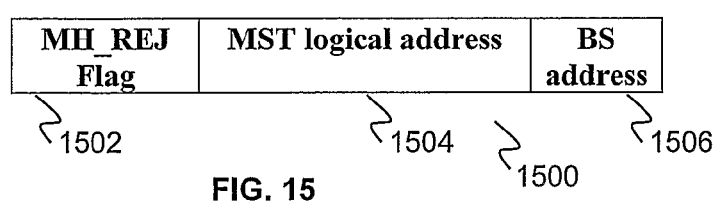
FIG. 15 is an example of the format of MH_REJ message as described in the example embodiment.

FIG. 15 shows an example of the format of a MH_REJ message 1500. The message comprises three fields, namely, a field indicating that it is a MH_REJ message (e.g. a predefined MH_REJ flag 1502 comprising a string of binary numbers), a field indicative of the requesting MS or MST (e.g. the logical address of the MS or MST 1504) and a field indicative of the servicing BS (e.g. the logical address of the BS 1506).

Figure 16:
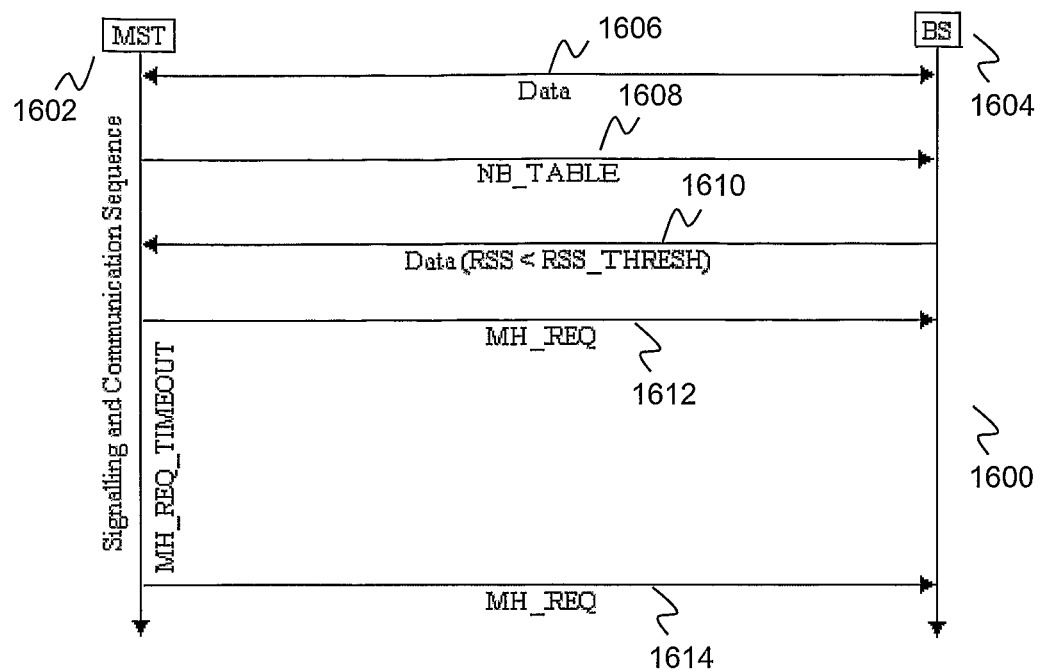
FIG. 16 is a time chart, showing a failure case of signaling and communication sequence during transition from SCN to MCN, as described in the example embodiment.

The complete picture of data exchange between the BS, MST and MSR for a failure case of multi-hop communication is described by time chart 1600 as shown in FIG. 16.

In this case, the MSR is not even in the picture because in the failure case none of them can be detected, found to be suitable or available for connection, only the BS 1604 and MST 1602 exist. As certain action sequences at some time instances are the same, FIG. 16 can make reference to FIG. 12. BS 1604 corresponds to BS 1204 in FIG. 12 and MST 1602 corresponds to MST 1202 in FIG. 12. At the start, actions occurring from time instance 1606, 1608, 1610 to time instance 1612 in that order are the same as the actions occurring from time instance 1206, 1208, 1210 to time instance 1212 of FIG. 12 in that order. Subsequently, when no MSR replies to the BS 1604, and a multi-hop request timeout occurs after $T_{MH\_REQ}$ at the MST expires; the MST will send another MH_REQ control message (600 in FIG. 6) to the BS 1604 at time instance 1614.

In the example embodiment, when a BS transmits the MH_REP control message (1300 in FIG. 13) to the MSR, it is coded using the downlink code of the MSR for the first hop.

Upon receiving this message, the MSR re-transmits this control message to the MST over the air interface at the next occurrence of MSR up-link time slot (which is identical to MST's downlink time slot in the example embodiment). The downlink code of the MST is applied in the second hop from MSR to MST.

The MST is assigned a new code for up-link direction by the BS when it receives the MH_REP message (1300 in FIG. 13) from MSR. The downlink code and time-slot along with the up-link time-slot are generally kept unchanged even after switching to multi-hopping so as to keep the overall system and the transition to multi-hopping functionally simple for easier implementation and wider acceptability. The MST reconfigures its up-link transmission to use the new code after it receives a MH_REP from the MSR.

The BS does not send any further data packets to the MST until it receives data or an acknowledgement from the MST (via multi-hopping with MSR). To supervise the reception of the data/acknowledgement, the BS sets a MH_REP_FLAG (1302 in FIG. 13) when it sends a MH_REP control message (1300 in FIG. 13). The MH_REP_FLAG is MS-specific, and the flag for MST requesting multi-hop communication is set in this case. If the BS does not receive an acknowledgement or data from the MST within a given period of time, the BS releases the resources that were made available for the MST. The MST should also detect a failure eventually after transmitting the maximum number of MH_REQ message (600 in FIG. 6).

The BS maintains a multi-hopping reference in a Resource Allocation Table (400 in FIG. 4) stored in its memory. Whenever the BS needs to send user data to an MS, it checks the Resource Allocation Table (400 in FIG. 4) to see if the data needs to be relayed.

Figure 17:
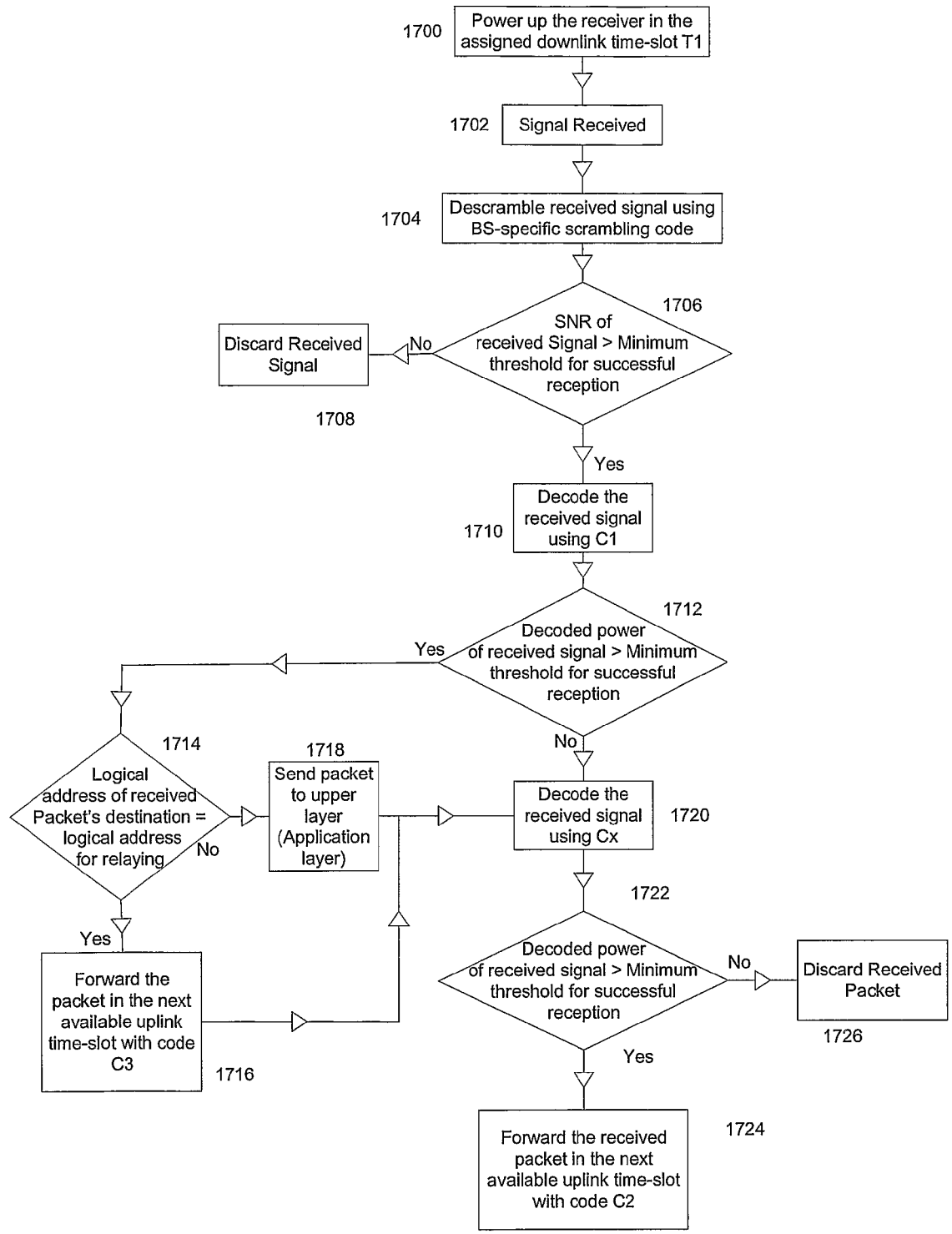
FIG. 17 is a flowchart showing the Message Reception Process at MSR as described in the example embodiment.

FIG. 17 shows the message reception process 1700 occurring at the MSR during multi-hop communication in the example embodiment.

First the MSR powers up its receiver circuitry at downlink time-slot T1 as shown in step 1700 of FIG. 17. It then receives the coded signals as shown in step 1702 which the MSR de-scrambles in step 1704 and then checks if the received signal power level is above a minimum pre-defined threshold for successful reception of signals in step 1706. If the received signal power level is less than the pre-defined threshold, the packet is dropped as shown in step 1708. Then the MSR decodes the received signal for code C1 in step 1710, which is the code assigned to the MSR for its own data reception. After decoding the received signal the MSR again checks in step 1712 for the power level of the decoded signal against the minimum threshold for successful reception. If the decoded signal power at this stage is more than the pre-defined threshold then the MSR checks for the logical destination address of the received packets in step 1714. The packets having destination address same as that of the MSR are sent to the higher layers for further processing as shown in step 1718, while the remaining packets are kept for re-transmission in the next uplink time-slot in the respective code as shown in step 1716 (Every MST being served by the MSR has a code reserved for MSR to MST communication which is kept in the internal memory of the MSR).

After steps 1716 and 1718 the MSR proceeds with decoding the received signal with respect to Cx in step 1720. Cx is the code assigned for MST to MSR communication. If the received power level of the decoded signal with respect to Cx is higher than the pre-defined threshold for successful reception of the packet which is checked in step 1722, the packet is forwarded in the next uplink time-slot as shown in step 1724. Otherwise the packet is discarded as shown in step 1726.

In step 1702, whenever a packet of data is received by the MSR via radio transmission, the data packet is next decoded in step 1704. Thereafter, in step 1706, it is descrambled.

After which, in step 1708, the MSR checks the packet header to see if it's a multi-hop or a single hop packet by checking logical address of the packet's destination in the packet's header. In case the logical address in the destination field of the received packet does not match with one of the logical addresses of the MSR, the packet goes up the protocol stack of the MSR in step 1710.

Otherwise, the MSR relays the packet in the next frame or the next available up-link timeslot according to the logical destination address supplied in the packet in step 1712. Every MSR maintains a list of all the MSTs for which it is acting as a relay, this list is shown in FIG. 18.

Figures 18, 19:
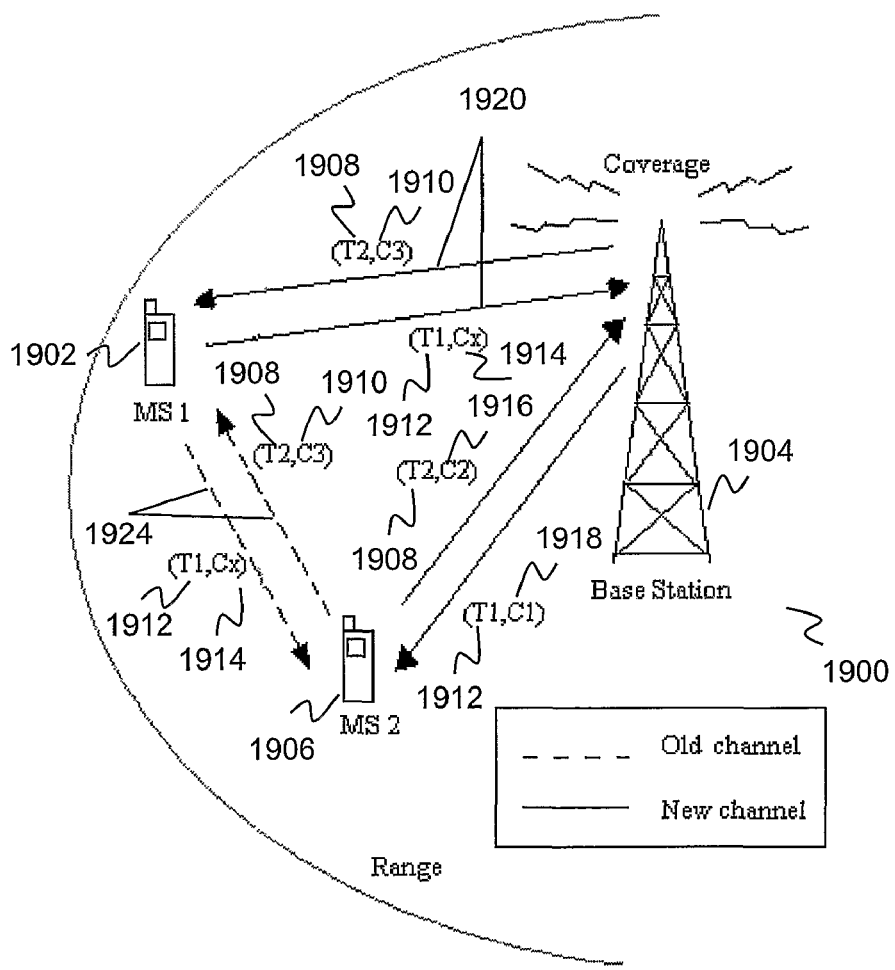
FIG. 18 is an example of a forwarding table maintained at MSR as described in the example embodiment.
FIG. 19 is a schematic layout showing a MST returning to the coverage of BS as described in the example embodiment.

The forwarding table 1800 maintained at the MSR in FIG. 18 comprises of the following details.
   a. List of all MST logical addresses 1802, in another example embodiment, a MSR may serve more than one MST or more than one BS;
   b. Up-link Code 1804 where each code for each MST is different from one another;
   c. Up-link Time Slot 1806 where each MST shares the common Up-link Time Slot;
   d. Downlink Code 1808 where each code for each MST is different from one another and different from Up-link Codes; and
   e. Downlink Time Slot 1810 where each MST shares the common Downlink Time Slot.

As shown in FIG. 18, each MST relayed by the MSR has an entry containing the logical address entry along with the associated downlink code for that MST.

The following will focus on the operations pertaining to the MST returning back to the coverage of BS from MCN to SCN.

FIG. 19 shows the transition from Multi-hop (BS↔MSR↔MST) communication to Single hop (BS↔MS) communication in a mobile communication cell 1900. Single hop communication is shown by non-dotted arrows 1922 and 1920, which are representative of the new channel communication between BS 1904 and Mobile Station 1 (MS1) 1902 and between BS 1904 and Mobile Station 2 (MS2) 1906 respectively. Multi-hop (BS↔MS) communication is shown by dotted lined arrows 1924, which are representative of the old channel communication.

In transition, with reference to FIG. 19, both Up-link and Downlink Time Slots T1 1912 and T2 1908 respectively and their Up-link and Downlink Codes Cx 1914 and C3 1910 respectively between MS1 1902 and MS2 1906 in the old channel is set the same as the Time Slots and Codes between MS1 1902 and BS 1904 in the new channel. As for the Up-link and Downlink Time Slots T2 1908 and T1 1912 respectively and their Up-link and Downlink Codes C2 1916 and C1 1918 respectively for single hop communication between BS 1904 and MS2 1906, they remain unchanged.

Figure 20:
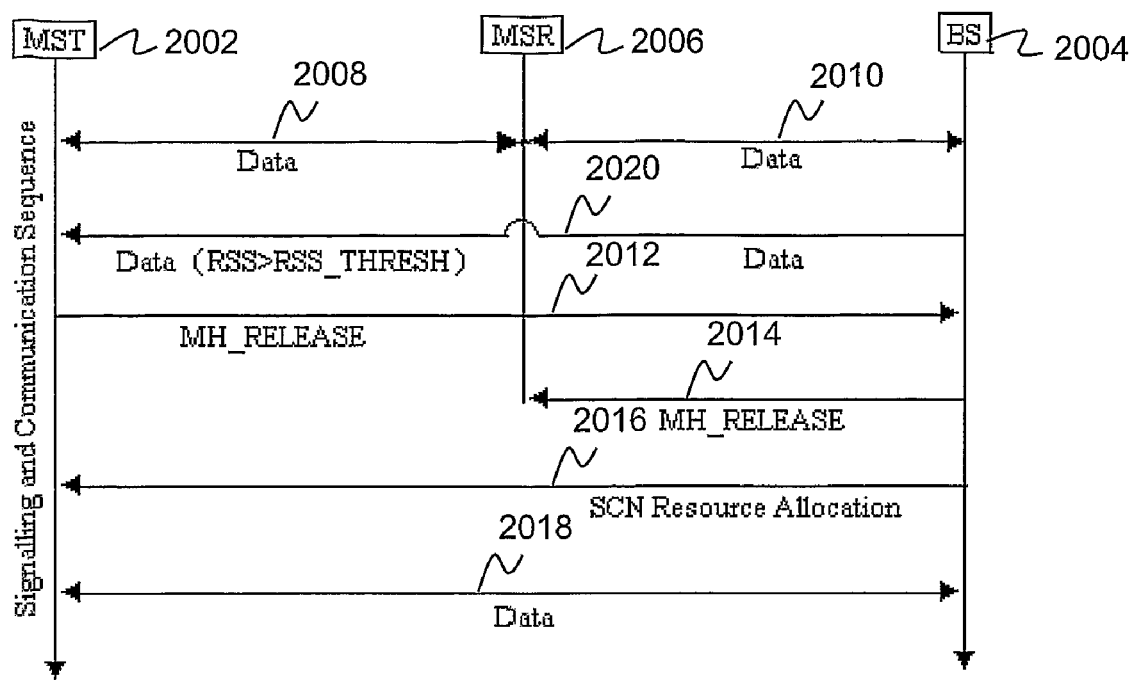
FIG. 20 is a time chart showing Multi-hop termination when MST re-enters the range of serving BS as described in the example embodiment.

FIG. 20 shows the time chart 2000 of action sequences taking place when MST 2002 re-enters the range of the serving BS 2004.

At the start, during time instances 2008 and 2010 between the MST 2002 and MSR 2006 and the MSR 2006 and BS 2004 respectively, data transmission occurs between the MST 2002 and BS 2004 in a two-hop fashion.

If the MST 2002 being served using MCN by a BS 2004 comes back into the range of the BS 2004 and is able to receive signals from the BS 2004 with a RSS value above the RSS threshold value, then the MST 2002 will cease sending data packets via the relay node MSR 2006 to the BS 2004. To achieve this the MST keeps scanning for BS periodically while it being served in multi-hop configuration. This is shown at time instance 2020 where data transmission goes directly to the MST 2002 from the BS 2004 without the help of MSR 2006.

Next, the MST 2002 sends a Multi-hop release (MH_RELEASE) control message in the form of a data packet via radio transmission to the BS 2004 at time instance 2012. When the BS 2004 receives MH_RELEASE from the MST 2002 via single hop that was earlier being served via multi-hop, the BS 2004 removes the entry of that MST 2002 from the Resource Allocation Table (400 in FIG. 4). Thereafter, at time instance 2014, the BS 2004 sends a MH_RELEASE control message to the MSR 2006 informing it to release the multi-hop connection.

Following release of multi-hop connection, at time instance 2016, the BS 2004 allocates resources for SCN by reconfiguring the channel parameters for MST 2002. For example, reconfiguring Quality of Service (QoS) level, reconfiguring the multiplexing and de-multiplexing of logical channel for MST 2002. The configuration instructions can be sent to the MST 2002 for example by way of the BS 2004 sending protocol packets via radio transmission to the MST 2002.

Once configuration is done, normal data transmission resumes between MST 2002 and BS 2004 at time instance 2018.

The example embodiments of the present invention may provide the following advantages.

An advantageous feature of the multi-hop signaling scheme presented in the example embodiments of this invention is that it does not require any route discovery nor does it require the MSs in the multi-hop cellular network to maintain gradient information for the rest of the MSs in that network. The mechanism presented in the example embodiments of this invention reduces the computational burden and control overhead entailed in maintaining such information at every MS. Maintaining gradient information requires exchanging large sets of gradient information among MS and the BS. This would also require the MS to maintain a large database of all the nodes in the cell and their corresponding gradient. This could lead to scalability problems and the gradient information may become quickly outdated if the mobility of the MS is very high.

Another advantage is that MSs at the edge of the cell do not have to apply high transmission power in order to send data to the BS since the entire transmission path is divided into two hops. This effectively reduces inter-cell interference, and maintains it at a reasonably low level.

Furthermore, a key advantage of the example embodiments described herein is an easy integration into present contemporary cellular CDMA system. The proposed scheme fits very naturally into the present cellular network. It utilizes identical multiple access technology, signal quality measurement and reporting means, and also preserves the centralized resource allocation principle using a BS already in existence in the present cellular communication systems. It is designed as an add-on technique, which can be easily integrated into the existing conventional cellular communication standard protocol TDD CDMA. Thus, without any major modification, it can be easily implemented on the conventional mobile phones and base stations.

Moreover, there is no requirement of a dual protocol stack or dual wireless radio interface to implement the proposed multi-hopping scheme presented in the example embodiments of this invention in the present cellular networks.

Further, the method presented in the example embodiment of this invention makes use of only one intermediate relay node station, thus greatly simplifying design challenges created by protocol overheads associated with establishing and maintaining long relaying routes which inturn helps to prevent frequent route failures since the possibility of route failure can increase with the number of intermediate hops Another advantage of the example embodiments of this invention is there is no overhead of beaconing as the MS detect their neighbors by hearing in a power saving state only in their assigned downlink timeslot. Hence, no extra usage of battery power to switch on the radio is required.

In addition, the technique of multi-hop communication described in the example embodiments of this invention can increase the range of the BS, without requiring the deployment of additional BSs and power-hungry modulation techniques. This is because when multi-hop communication is used in cellular networks, the technique as described can help to cover the same cell size by connecting far away nodes to the BS if the BS reduces its transmit power so as to decrease the range of the BS. This has the advantage of reduced interference due to lesser transmit power while still maintaining faster modulation to support higher data rates. In addition, the adverse effects of shadowed areas in a wireless cellular coverage area can be mitigated with the use of the multi-hop communication technique described herein. The example embodiments presented in this invention, helps in reducing the probability of drop calls when an MS in the cell goes out of the nominal range of the BS.

In the foregoing manner, a system & method for relaying in multi-hop cellular networks is disclosed. Only several embodiments are described. However, it will be apparent to one skilled in the art in view of this disclosure that numerous changes and/or modifications may be made without departing from the scope of the invention.

The invention claimed is:

1. A radio communication system using a TDD-CDMA multiple access system comprising:
   a mobile station;
   a base station;
   wherein the mobile station is configured to measure signal strength values of coded signals transmitted from neighboring mobile stations and a received signal strength of a signal from the base station, and is configured to send candidate relay station information based on the measured signal strength values directly to the base station;
   wherein if the received signal strength is below a threshold value, the mobile station is configured to send a request message directly to the base station requesting for a switch from single hop to multi-hop communication between itself and the base station; and
   wherein the base station decides whether or not to establish multi-hop communication with the mobile station upon receipt of said request and based on the candidate relay station information.

2. The system as claimed in claim 1, wherein each mobile station uses the same respective up-link and downlink communication timeslots in both single-hop and multi-hop communications.

3. The system as claimed in claim 1, wherein a relay mobile station utilizes the same respective up-link and down-link communication timeslots for both communications with the base station and communications with a relayed mobile station (MST), wherein different codes are used in the uplink and downlink directions for communicating with the base station and the relayed mobile station MST.

4. The system as claimed in claim 1, wherein the measurement of the signal strength values of coded signals transmitted from neighboring mobile stations comprises measuring the signal strength of coded signals from neighboring mobile stations received in the same time slot as communications received from the base station.

5. The system as claimed in claim 4, wherein the measurement at the mobile station further comprises scanning an entire frequency channel for one complete frame and measuring the signal strength of coded signals from neighboring mobile stations.

6. The system as claimed in claim 5, wherein the entire frequency channel is scanned if there exists no mobile station that can act as a relay mobile station whose up-link timeslot is the same as the assigned down-link timeslot of the measuring mobile station.

7. The system as claimed in claim 1, wherein a relay mobile station comprises a storage means for maintaining a forwarding table to store values of logical addresses of the base station and neighboring mobile stations.

8. The system as claimed in claim 1, wherein the base station is capable of sending a signal to a relay mobile station using a first control message, wherein the first control message comprises downlink code usable by the mobile station to communicate with the relay mobile station.

9. The system as claimed in claim 1, wherein a relay mobile station is capable of sending a signal to the mobile station using a second control message, wherein the second control message comprises an uplink code and a time slot to be used by the mobile station in communication with the relay mobile station.

10. The system as claimed in claim 8, further comprising:
the relay mobile station de-multiplexing a received data stream comprising one or more of three coded signals, wherein: a first coded signal is associated with data streaming from the base station and destined for the relay mobile station; a second coded signal is associated with data streaming from the base station and destined for the mobile station; and a third coded signal is associated with data streaming from the mobile station to the relay mobile station;
the relay mobile station re-transmitting the second coded, de-multiplexed signal on the next available up-link timeslot using the up-link code specified in the received first control message; and
the relay mobile station multiplexing the third coded, de-multiplexed signal with an up-link data stream originating from the relay mobile station itself, on the next available up-link time-slot using the up-link code of the relay mobile station.

11. The system as claimed in claim 1, wherein a relay mobile station maintains a forwarding table to store values of a logical address of the mobile station that it is serving.

12. The system as claimed in claim 1, wherein the mobile station is capable of distinguishing neighboring mobile stations of the same cell and neighboring mobile stations of adjacent cells by utilizing a variation in a scrambling code used in adjacent cells.

13. The system as claimed in claim 1, wherein the mobile station is capable of sending a signal from the mobile station to a relay mobile station for stopping multi-hop communication by sending a control message when the mobile station detects that the received signal strength (RSS) of the base station is greater than the threshold value.

14. The system as claimed in claim 1, wherein the mobile station is capable of monitoring, by using a timer, receipt of a control message from the base station within a specified amount of time.

15. The system as claimed in claim 1, wherein the candidate relay station information comprises a list of the neighboring mobile stations; and the base station selects a relay mobile station from the list of neighboring mobile stations.

16. A method of radio communication using a TDD-CDMA multiple access system comprising:
measuring, at a mobile station, signal strength values of coded signals transmitted from neighboring mobile stations and a received signal strength of a signal from the base station;
sending candidate relay station information based on the measured signal strength values from the mobile station directly to the base station;
sending, if the received signal strength is below a threshold value, a request message from the mobile station directly to the base station in single hop communication for a switch from single hop to multi-hop communication between the mobile station and the base station; and
deciding, at the base station, whether or not to establish multi-hop communication with the mobile station upon receipt of said request and based on the candidate relay station information.

17. The method as claimed in claim 16, wherein each mobile station uses the same respective up-link and downlink communication timeslots in both single-hop and multi-hop communications.

18. The method as claimed in claim 16, wherein a relay mobile station utilizes the same respective up-link and down-link communication timeslots for both communications with the base station and communications with a relayed mobile station (MST), wherein different codes are used in the uplink and downlink directions for communicating with the base station and the relayed mobile station (MST).

19. The method as claimed in claim 16, wherein the measuring at the mobile station the signal strength values of coded signals transmitted from neighboring mobile stations comprises measuring the signal strength of coded signals from neighboring mobile stations received in the same time slot as communications received from the base station.

20. The method as claimed in claim 19, wherein the measuring at the mobile station further comprises scanning an entire frequency channel for one complete frame and measuring the signal strength of coded signals from neighboring mobile stations.

21. The method as claimed in claim 20, wherein the entire frequency channel is scanned if there exists no mobile station that can act as a relay mobile station whose up-link timeslot is the same as the assigned down-link timeslot of the measuring mobile station.

22. The method as claimed in claim 16, further comprising maintaining in a storage means of a relay mobile station a forwarding table to store values of logical addresses of the base station and neighboring mobile stations.

23. The method as claimed in claim 16, further comprising sending a signal from the base station to a relay mobile station using a first control message, wherein the first control message comprises downlink code usable by the mobile station to communicate with the relay mobile station.

24. The method as claimed in claim 16, further comprising sending a signal from a relay mobile station to the mobile station using a second control message, wherein the second control message comprises an uplink code and a time slot to be used by the mobile station in communication with the relay mobile station.

25. The method as claimed in claim 23, further comprising:
de-multiplexing at the relay mobile station a received data stream comprising one or more of three coded signals, wherein: a first coded signal is associated with data streaming from the base station and destined for the relay mobile station; a second coded signal is associated with data streaming from the base station and destined for the mobile station; and a third coded signal is associated with data streaming from the mobile station to the relay mobile station;
re-transmitting at the relay mobile station the second coded, de-multiplexed signal on the next available up-link timeslot using the up-link code specified in the received first control message; and
multiplexing at the relay mobile station the third coded, de-multiplexed signal with an up-link data stream originating from the relay mobile station itself, on the next available up-link time-slot using the up-link code of the relay mobile station.

26. The method as claimed in claim 16, further comprising maintaining at a relay mobile station a forwarding table to store values of a logical address of the mobile station that it is serving.

27. The method as claimed in claim 16, further comprising distinguishing at the mobile station neighboring mobile stations of the same cell and neighboring mobile stations of adjacent cells by utilizing a variation in a scrambling code used in adjacent cells.

28. The method as claimed in claim 16, further comprising sending a signal from the mobile station to a relay mobile station for stopping multi-hop communication by sending a control message when the mobile station detects that the received signal strength (RSS) of the base station is greater than the threshold value.

29. The method as claimed in claim 16, further comprising monitoring at the mobile station, by using a timer, receipt of a control message from the base station within a specified amount of time.

30. The method as claimed in claim 16, wherein the candidate relay station information comprises a list of the neighboring mobile stations; and the method further comprises selecting at the base station a relay mobile station from the list of neighboring mobile stations.

\* \* \* \* \*